(No Model.)

A. J. WUERFEL.
TAILOR'S RULE.

No. 364,620. Patented June 7, 1887.

WITNESSES:
George Binkenburg
C. Sedgwick

INVENTOR:
A. J. Wuerfel
BY Munn & Co.
ATTORNEYS.

UNITED STATES PATENT OFFICE.

AUGUSTA JULIA WUERFEL, OF MILWAUKEE, WISCONSIN.

TAILOR'S RULE.

SPECIFICATION forming part of Letters Patent No. 364,620, dated June 7, 1887.

Application filed December 23, 1886. Serial No. 222,362. (No model.)

*To all whom it may concern:*

Be it known that I, AUGUSTA JULIA WUERFEL, of Milwaukee, in the county of Milwaukee and State of Wisconsin, have invented a new and Improved Tailor's Rule, of which the following is a full, clear, and exact description.

The object of my invention is to provide a new and improved tailor's rule for cutting any size or style of garments for ladies and children, including boys up to nine years, without the use of patterns, and the use of which may be quickly learned.

The invention consists of two instruments used in connection with each other, each instrument being provided with a number of scales.

Reference is to be had to the accompanying drawings, forming a part of this specification, in which similar letters of reference indicate corresponding parts in both the figures.

Figure 1:
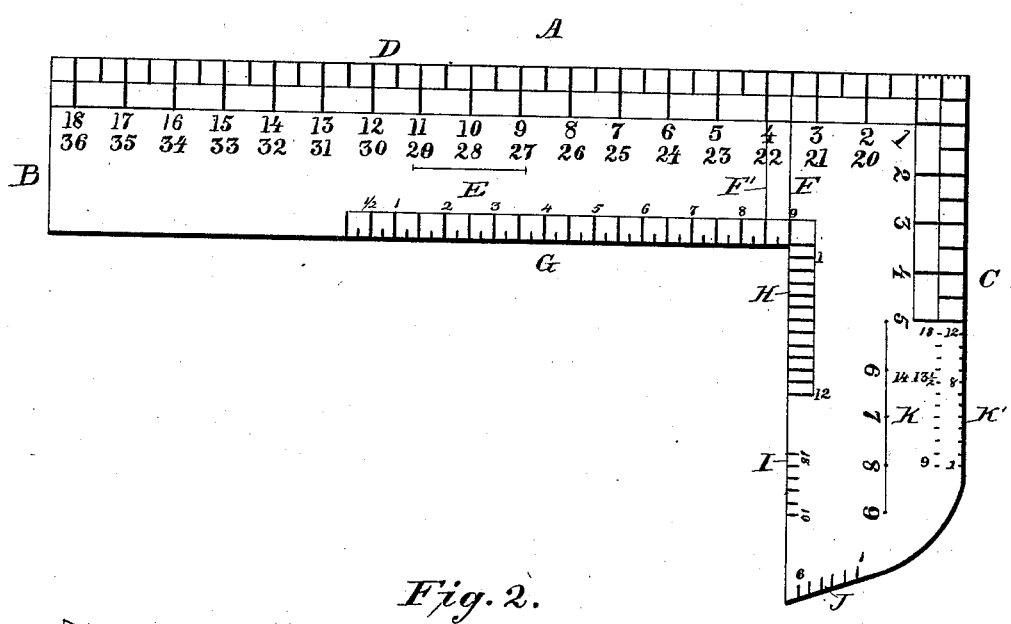
Figure 2:
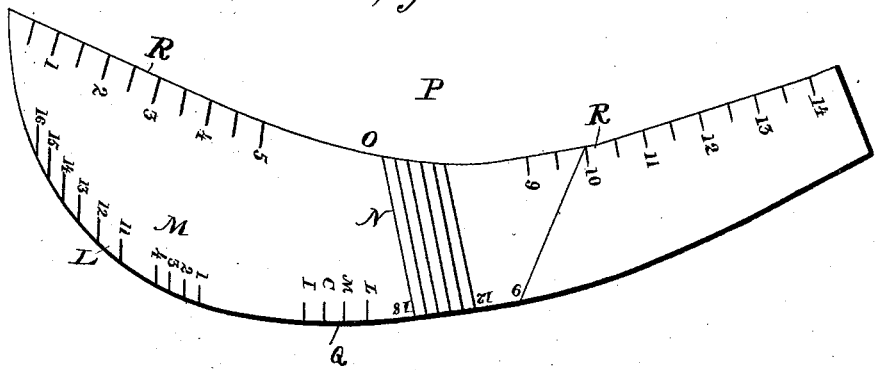

Figure 1 is a face view of the square, and Fig. 2 is a similar view of a curved blade for marking out the curved parts of the garment.

The square A (represented in Fig. 1) is provided with two blades, B and C, the outer edge of the blade B being provided with an inch-scale, D, having two rows of numerals, one of which runs from 1 to 18 and the other from 19 to 36 inches, thus completing the yard-measure. The inches are divided into subdivisions of halves and quarters. On the blade B is arranged the line E, which is a guide for the front shoulder. The two cross-lines F and F' on the blade B represent guides for the front bust-measure, and the first line, F, is three and one-half inches from the inner end of the plate B, and is for measuring a child's bust, and the line F', which is four inches from the inner end of the said blade B, is intended as a guide for the bust-measure of ladies. The inner edge of the blade D is provided with the scale G, running from one to nine inches, with subdivisions of half and quarter inches, and this scale is intended for measuring the length of the shoulder.

On the inner edge of the blade C is formed a scale, H, measuring quarter-inches, which are marked with the numerals from 1 to 12, and this scale H corresponds with the scale G, and is intended for measuring the height of the shoulder. The outer edge of the blade C is rounded off, as shown in Fig. 1, and the outer part of the blade C is provided with the three scales I, J, and K, which form the combined neck-scale, and of which the scale I is marked with the numerals 10 to 18, to correspond with the width of the neck, and also to correspond with the scale J, marked with the numerals 1 to 6, and intended as the back neck-scale for representing different widths of necks. This scale also corresponds with the scale K, having the numerals 9 to 18 and subdivisions which represent eighteen inches for eighteen different-sized necks. The scale K', marked with the figures 1 to 12 on the outer edge of the scale C, indicates the size of neck, and corresponds with the neck-scale I.

Fig. 2 represents the instrument P, for marking the backs of garments, and it is provided with the curved edge L, on which is formed the scale M, for measuring and shaping the back of the arm-size and back of the bust-measure. The numerals 11 to 16 on this scale M indicate different sizes of busts. The numerals 1 to 4 of the same scale are for splicing back and side form. The part Q of the scale M represents different sized arm-sizes, and the letters I and C stand for the armholes of children's, the letter M for armholes of misses', and the letter L for the armholes of ladies' garments.

The lines N run across the blade P, are marked with the numerals 12 to 18, and are guide-lines for back draft. The numerals 9 to 18 represent different sizes of neck and width of back. The curved inner edge, O, of the blade P is provided with an inch-scale, R, having subdivisions, and the said scale is used for representing and measuring the curved back and side forms.

Having thus described my invention, what I claim as new, and desire to secure by Letters Patent, is—

1. In a tailor's rule, the square A, formed of the blades B C, the blade B being provided with the shoulder-guide E, bust-measure guides F, and the shoulder-scale G, and the blade C having its outer edge rounded and provided with shoulder-scale H and the neck-scale I J K, substantially as herein shown and described.

2. In a tailor's rule, the blade P, having the curved outer edge, L, and the curved inner edge, O, and provided with the back and arm scales M Q, the guide-lines N, and the back and side scale R, substantially as herein shown and described.

3. A tailor's rule consisting of the square having its blade C rounded and provided with the shoulder-guide E, the bust-measure guides F, the shoulder-scales G H, and the neck-scales I J K, and the curved blade P, provided with the back and arm scales M Q, the guides N, and the back and side scale R, substantially as herein shown and described.

AUGUSTA JULIA WUERFEL.

Witnesses:
A. C. GIESELER,
CARL SCHNELL.